United States Patent
Holzer et al.

(10) Patent No.: US 11,748,907 B2
(45) Date of Patent: *Sep. 5, 2023

(54) OBJECT POSE ESTIMATION IN VISUAL DATA

(71) Applicant: Fyusion, Inc., San Francisco, CA (US)

(72) Inventors: Stefan Johannes Josef Holzer, San Mateo, CA (US); Pavel Hanchar, Minsk (BY); Abhishek Kar, Berkeley, CA (US); Matteo Munaro, San Francisco, CA (US); Krunal Ketan Chande, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/502,579

(22) Filed: Oct. 15, 2021

(65) Prior Publication Data
US 2022/0108472 A1   Apr. 7, 2022

Related U.S. Application Data

(63) Continuation of application No. 16/518,570, filed on Jul. 22, 2019, now Pat. No. 11,176,704.
(Continued)

(51) Int. Cl.
*G06N 3/08* (2023.01)
*G06T 7/73* (2017.01)
*G06T 7/593* (2017.01)

(52) U.S. Cl.
CPC .............. *G06T 7/75* (2017.01); *G06N 3/08* (2013.01); *G06T 7/596* (2017.01); *G06T 2207/30248* (2013.01)

(58) Field of Classification Search
CPC . G06T 7/75; G06T 7/596; G06T 2207/30248; G06T 2207/20081;
(Continued)

(56) References Cited

U.S. PATENT DOCUMENTS 5,764,306 A   6/1998 Steffano
5,923,380 A   7/1999 Yang
(Continued)

FOREIGN PATENT DOCUMENTS

GB    2573170 A       10/2019
WO    2016064921 A1   4/2016
(Continued)

OTHER PUBLICATIONS

Office Action (Non-Final Rejection) dated Jun. 15, 2022 for U.S. Appl. No. 16/861,097 (pp. 1-17).
(Continued)

*Primary Examiner* — Siamak Harandi
(74) *Attorney, Agent, or Firm* — Kwan & Olynick LLP

(57) ABSTRACT

The pose of an object may be estimated based on fiducial points identified in a visual representation of the object. Each fiducial point may correspond with a component of the object, and may be associated with a first location in an image of the object and a second location in a 3D coordinate pace. A 3D skeleton of the object may be determined by connecting the locations in the 3D space, and the object's pose may be determined based on the 3D skeleton.

20 Claims, 8 Drawing Sheets

Related U.S. Application Data

(60) Provisional application No. 62/795,440, filed on Jan. 22, 2019, provisional application No. 62/795,434, filed on Jan. 22, 2019.

(58) Field of Classification Search
CPC . G06T 2207/20084; G06T 2207/30244; G06T 2207/10016; G06T 7/73; G06T 7/579; G06N 3/08
See application file for complete search history.

(56) References Cited

U.S. PATENT DOCUMENTS

| | | | |
|---|---|---|---|
| 6,067,369 A | 5/2000 | Kamei | |
| 6,453,069 B1 | 9/2002 | Matsugu | |
| 6,788,309 B1 | 9/2004 | Swan | |
| 6,879,956 B1 | 4/2005 | Honda | |
| 6,912,313 B2 | 6/2005 | Li | |
| 7,249,019 B2 | 7/2007 | Culy | |
| 7,292,257 B2 | 11/2007 | Kang | |
| 7,565,004 B2 | 7/2009 | Hashimoto | |
| 7,949,529 B2 | 5/2011 | Weider | |
| 9,182,229 B2 | 11/2015 | Grässer | |
| 9,218,698 B2 | 12/2015 | Ricci | |
| 9,467,750 B2 | 10/2016 | Banica | |
| 9,495,764 B1 | 11/2016 | Boardman | |
| 9,886,636 B2 | 2/2018 | Zhang | |
| 9,886,771 B1 | 2/2018 | Chen | |
| 10,319,094 B1 | 6/2019 | Chen | |
| 10,373,387 B1 | 8/2019 | Fields | |
| 10,573,012 B1 | 2/2020 | Collins | |
| 10,636,148 B1 | 4/2020 | Chen | |
| 10,657,647 B1 | 5/2020 | Chen | |
| 10,698,558 B2 | 6/2020 | Holzer | |
| 10,893,213 B2 * | 1/2021 | Magnuszewski | G03B 37/005 |
| 11,004,188 B2 | 5/2021 | Holzer | |
| 2002/0063714 A1 | 5/2002 | Haas | |
| 2002/0198713 A1 | 12/2002 | Franz | |
| 2004/0258306 A1 | 12/2004 | Hashimoto | |
| 2007/0253618 A1 | 11/2007 | Kim | |
| 2008/0101656 A1 | 5/2008 | Barnes | |
| 2008/0180436 A1 | 7/2008 | Kraver | |
| 2009/0289957 A1 | 11/2009 | Sroka | |
| 2010/0111370 A1 | 5/2010 | Black | |
| 2010/0251101 A1 | 9/2010 | Haussecker | |
| 2011/0218825 A1 | 9/2011 | Hertenstein | |
| 2013/0297353 A1 | 11/2013 | Strange | |
| 2014/0119604 A1 | 5/2014 | Mai | |
| 2014/0172245 A1 | 6/2014 | Soles | |
| 2015/0029304 A1 | 1/2015 | Park | |
| 2015/0097931 A1 | 4/2015 | Hatzilias | |
| 2015/0103170 A1 | 4/2015 | Nelson | |
| 2015/0125049 A1 | 5/2015 | Taigman | |
| 2015/0278987 A1 | 10/2015 | Mihara | |
| 2015/0317527 A1 | 11/2015 | Graumann | |
| 2015/0347845 A1 | 12/2015 | Benson | |
| 2015/0365661 A1 | 12/2015 | Hayashi | |
| 2016/0035096 A1 | 2/2016 | Rudow | |
| 2017/0109930 A1 | 4/2017 | Holzer | |
| 2017/0199647 A1 | 7/2017 | Richman | |
| 2017/0208246 A1 | 7/2017 | Kimura | |
| 2017/0277363 A1 | 9/2017 | Holzer | |
| 2017/0293894 A1 | 10/2017 | Taliwal | |
| 2018/0027178 A1 | 1/2018 | MacMillan | |
| 2018/0160102 A1 | 6/2018 | Luo | |
| 2018/0190017 A1 | 7/2018 | Mendez | |
| 2018/0225858 A1 | 8/2018 | Ni | |
| 2018/0255290 A1 | 9/2018 | Holzer | |
| 2018/0260793 A1 | 9/2018 | Li | |
| 2018/0293552 A1 | 10/2018 | Zhang | |
| 2018/0315260 A1 | 11/2018 | Anthony | |
| 2018/0322623 A1 | 11/2018 | Memo | |
| 2018/0338126 A1 | 11/2018 | Trevor | |
| 2018/0349746 A1 | 12/2018 | Vallespi-Gonzalez | |
| 2019/0012394 A1 | 1/2019 | Endras | |
| 2019/0035165 A1 | 1/2019 | Gausebeck | |
| 2019/0066304 A1 | 2/2019 | Hirano | |
| 2019/0073641 A1 | 3/2019 | Utke | |
| 2019/0098277 A1 | 3/2019 | Takama | |
| 2019/0116322 A1 | 4/2019 | Holzer | |
| 2019/0147221 A1 | 5/2019 | Grabner | |
| 2019/0147583 A1 | 5/2019 | Stefan | |
| 2019/0164301 A1 | 5/2019 | Kim | |
| 2019/0189007 A1 | 6/2019 | Herman | |
| 2019/0196698 A1 | 6/2019 | Cohen | |
| 2019/0197196 A1 | 6/2019 | Yang | |
| 2019/0205086 A1 | 7/2019 | McNulty | |
| 2019/0317519 A1 | 10/2019 | Chen | |
| 2019/0318759 A1 | 10/2019 | Doshi | |
| 2019/0335156 A1 | 10/2019 | Rusu | |
| 2019/0349571 A1 | 11/2019 | Herman | |
| 2019/0392569 A1 | 12/2019 | Finch | |
| 2020/0111201 A1 | 4/2020 | Kuruvilla | |
| 2020/0118342 A1 | 4/2020 | Varshney | |
| 2020/0151860 A1 | 5/2020 | Safdarnejad | |
| 2020/0193675 A1 | 6/2020 | Burnett, III | |
| 2020/0231286 A1 | 7/2020 | Movsesian | |
| 2020/0233892 A1 | 7/2020 | Calhoun | |
| 2020/0234397 A1 | 7/2020 | Holzer | |
| 2020/0234398 A1 | 7/2020 | Holzer | |
| 2020/0234424 A1 | 7/2020 | Holzer | |
| 2020/0234451 A1 | 7/2020 | Holzer | |
| 2020/0234488 A1 | 7/2020 | Holzer | |
| 2020/0236296 A1 | 7/2020 | Holzer | |
| 2020/0236343 A1 | 7/2020 | Holzer | |
| 2020/0257862 A1 | 8/2020 | Kar | |
| 2020/0258309 A1 | 8/2020 | Holzer | |
| 2020/0312028 A1 | 10/2020 | Charvat | |
| 2020/0322546 A1 | 10/2020 | Carolus | |
| 2020/0349757 A1 | 11/2020 | Holzer | |

FOREIGN PATENT DOCUMENTS

| | | | |
|---|---|---|---|
| WO | 2017115149 A1 | 7/2017 | |
| WO | WO-2017115149 A1 * | 7/2017 | G06T 15/205 |
| WO | 2017195228 A1 | 11/2017 | |
| WO | 2019186545 | 10/2019 | |
| WO | 2019229912 | 12/2019 | |
| WO | 2020009948 A1 | 1/2020 | |
| WO | 2020125726 | 6/2020 | |
| WO | 2020154096 A1 | 7/2020 | |

OTHER PUBLICATIONS

Office Action (Non-Final Rejection) dated Jun. 15, 2022 for U.S. Appl. No. 16/861,100 (pp. 1-18).

Office Action (Non-Final Rejection) dated Jul. 22, 2022 for U.S. Appl. No. 17/351,124 (pp. 1-12).

Office Action dated Jun. 15, 2022 for U.S. Appl. No. 17/190,268 (pp. 1-17).

Extended European Search Report issued in App. No. EP20744281.5, dated Aug. 12, 2022, 7 pages.

Office Action (Final Rejection) dated Aug. 12, 2022 for U.S. Appl. No. 16/518,501 (pp. 1-21).

Office Action (Final Rejection) dated Aug. 12, 2022 for U.S. Appl. No. 16/518,558 (pp. 1-18).

Office Action (Non-Final Rejection) dated Aug. 18, 2022 for U.S. Appl. No. 17/174,250 (pp. 1-17).

Office Action (Notice of Allowance and Fees Due (PTOL-85)) dated Aug. 17, 2022 for U.S. Appl. No. 16/692,219 (pp. 1-7).

Office Action (Notice of Allowance and Fees Due (PTOL-85)) dated Apr. 7, 2022 for U.S. Appl. No. 17/215,596 (pp. 1-9).

Office Action (Notice of Allowance and Fees Due (PTOL-85)) dated Sep. 15, 2021 for U.S. Appl. No. 16/518,570 (pp. 1-8).

Office Action dated Jul. 16, 2021 for U.S. Appl. No. 16/518,501 (pp. 1-23).

Office Action dated Jul. 26, 2021 for U.S. Appl. No. 16/518,558 (pp. 1-17).

Office Action dated Jun. 14, 2021 for U.S. Appl. No. 16/518,570 (pp. 1-24).

(56) References Cited

OTHER PUBLICATIONS

Office Action dated May 18, 2021 for U.S. Appl. No. 16/692,219 (pp. 1-13).
Riza Alp Guler et al., "DensePose: Dense Human Pose Estimation In The Wild", arXiv:1802.00434v1 [cs.CV] Feb. 1, 2018, 12 pages.
Shubham Tulsiani and Jitendra Malik, "Viewpoints and Keypoints", arXiv:1411.6067v2 [cs.CV] Apr. 26, 2015, 10 pages.
Wenhao Lu, et al., "Parsing Semantic Parts of Cars Using Graphical Models and Segment Appearance Consistency", arXiv:1406 2375v2 [cs CV] Jun. 11, 2014, 12 pages.
Alberto Chavez-Aragon, et al., "Vision-Based Detection and Labelling of Multiple Vehicle Parts", 2011 14th International IEEE Conference on Intelligent Transportation Systems Washington, DC, USA. Oct. 5-7, 2011, 6 pages.
U.S. Appl. No. 16/518,501, CTFR—Final Rejection, dated Dec. 9, 2020, 16 pgs.
U.S. Appl. No. 16/518,501, Examiner Interview Summary Record (Ptol-413), dated Nov. 23, 2020, 2 pgs.
U.S. Appl. No. 16/518,501, Non-Final Rejection, dated Sep. 1, 2020, 15 pgs.
U.S. Appl. No. 16/518,512, Examiner Interview Summary Record (Ptol-413), dated Nov. 19, 2020, 3 pgs.
U.S. Appl. No. 16/518,512, Non-Final Rejection, dated Oct. 1, 2020, 24 pgs.
U.S. Appl. No. 16/518,512, Office Action Appendix, dated Nov. 19, 2020, 1 pg.
U.S. Appl. No. 16/518,558, Non-Final Rejection, dated Sep. 8, 2020, 14 pgs.
U.S. Appl. No. 16/518,585, Non-Final Rejection, dated Sep. 3, 2020, 13 pgs.
U.S. Appl. No. 16/596,516, Non-Final Rejection, dated Jun. 23, 2020, 37 pgs.
U.S. Appl. No. 16/596,516, Notice of Allowance and Fees Due (Ptol-85), dated Sep. 21, 2020, 10 pgs.
U.S. Appl. No. 16/692,133, Non-Final Rejection, dated Jul. 24, 2020, 17 pgs.
U.S. Appl. No. 16/692,170, Non-Final Rejection, dated Nov. 20, 2020, 13 pgs.
U.S. Appl. No. 16/692,219, Non-Final Rejection, dated Dec. 8, 2020, 9 pgs.
U.S. Appl. No. 16/861,100, Non-Final Rejection, dated Oct. 8, 2020, 11 pgs.
U.S. Appl. No. 16/518,512, Notice of Allowance dated Jan. 25, 2021, 7 pgs.
U.S. Appl. No. 16/518,512, Notice of Allowance dated Dec. 16, 2020, 9 pgs.
U.S. Appl. No. 16/518,558, Examiner Interview Summary dated Dec. 16, 2020, 1 pg.
U.S. Appl. No. 16/518,558, Final Office Action dated Dec. 16, 2020, 16 pgs.
U.S. Appl. No. 16/518,570, Non-Final Office Action dated Jan. 6, 2021, 17 pgs.
U.S. Appl. No. 16/518,585, Notice of Allowance dated Dec. 14, 2020, 5 pgs.
U.S. Appl. No. 16/692,133, Notice of Allowance dated Dec. 15, 2020, 7pgs.
U.S. Appl. No. 16/692,170, Notice of Allowance dated Feb. 9, 2021, 8 pgs.
U.S. Appl. No. 16/861,100, Advisory Action dated Jun. 10, 2021, 3 pgs.
U.S. Appl. No. 16/861,100, Examiner Interview Summary dated Feb. 10, 2021, 2 pgs.
U.S. Appl. No. 16/861,100, Examiner Interview Summary dated Jun. 10, 2021, 1 pg.
U.S. Appl. No. 16/861,100, Examiner Interview Summary dated Jun. 3, 2021, 2 pgs.
U.S. Appl. No. 16/861,100, Final Office Action dated Feb. 26, 2021, 15 pgs.
Gerd Lindner et al., "Structure-Preserving Sparsification of Social Networks", arXiv:1505.00564v1 [cs.SI] May 4, 2015, 8 pages.

Int'l Application Serial No. PCT/US20/12592, Int'l Search Report and Written Opinion dated Apr. 21, 2020. 9 pages.
International Search Report and Written Opinion for App. No. PCT/US2021/013431, dated May 6, 2021, 10 pages.
International Search Report and Written Opinion for App. No. PCT/US2021/013471, dated May 6, 2021, 10 pages.
International Search Report and Written Opinion for App. No. PCT/US2021/013472, dated May 11, 2021, 10 pages.
Jeff Donahue et al., "DeCAF: ADeep Convolutional Activation Feature for Generic Visual Recognition", arXiv: 1310.153v1 [cs.CV] Oct. 6, 2013, 10 pages.
Office Action (Final Rejection) dated Jan. 19, 2022 for U.S. Appl. No. 16/861,097 (pp. 1-16).
Office Action (Final Rejection) dated Jan. 19, 2022 for U.S. Appl. No. 16/861,100 (pp. 1-19).
Office Action (Final Rejection) dated Jan. 20, 2022 for U.S. Appl. No. 17/215,596 (pp. 1-16).
Office Action (Final Rejection) dated Mar. 3, 2022 for U.S. Appl. No. 17/174,250 (pp. 1-24).
Office Action (Final Rejection) dated Apr. 19, 2022 for U.S. Appl. No. 16/692,219 (pp. 1-13).
Office Action (Final Rejection) dated Nov. 9, 2021 for U.S. Appl. No. 16/518,558 (pp. 1-17).
Office Action (Final Rejection) dated Dec. 7, 2021 for U.S. Appl. No. 16/518,501 (pp. 1-21).
Office Action (Final Rejection) dated Jun. 14, 2021 for U.S. Appl. No. 16/518,570 (pp. 1-23).
Office Action (Non-Final Rejection) dated Mar. 28, 2022 for U.S. Appl. No. 16/518,501 (pp. 1-21).
Office Action (Non-Final Rejection) dated Mar. 29, 2022 for U.S. Appl. No. 16/518,558 (pp. 1-16).
Office Action (Non-Final Rejection) dated Apr. 14, 2022 for U.S. Appl. No. 17/144,879 (pp. 1-12).
Office Action (Non-Final Rejection) dated Sep. 2, 2021 for U.S. Appl. No. 17/174,250 (pp. 1-22).
Office Action (Non-Final Rejection) dated Sep. 20, 2021 for U.S. Appl. No. 16/861,100 (pp. 1-19).
Office Action (Non-Final Rejection) dated Sep. 24, 2021 for U.S. Appl. No. 17/215,596 (pp. 1-14).
Office Action (Non-Final Rejection) dated Oct. 4, 2021 for U.S. Appl. No. 16/861,097 (pp. 1-15).
Office Action (Non-Final Rejection) dated Dec. 7, 2021 for U.S. Appl. No. 16/692,219 (pp. 1-12).
Dorfler Martin et al., "Application of Surface Reconstruction for Car Undercarriage Inspection", 2020 3rd International Conference on Intelligent Robotic and Control Engineering (IRCE), IEEE, (Aug. 10, 2020), doi: 10.1109/IRCE50905.2020.9199251, pp. 47-51, XP033828019 Abstract Only.
Giegerich, et al., "Automated Classification of "Bad Images" by Means of Machine Learning for Improved Analysis of Vehicle Undercarriages," TechConnect Briefs 2022, pp. 1-4.
Green, et al., "Vehicle Underscarriage Scanning for use in Crash Reconstruction," FARO White Paper, 2015, 5 pages.
IVUS Intelligent Vehicle Undercarriage Scanner Brochusre, GatekeeperSecurity.com, 2 pages.
Kiong, Frederick Chong Chuen, "Vehicle Undercarriage Scanning System," A disseration for ENG 4111 and ENG 4112 Research Project, University of Southern Queensland (USQ), Oct. 27, 2005, 163 pages.
Office Action (Final Rejection) dated Jan. 31, 2023 for U.S. Appl. No. 17/351,124 (pp. 1-14).
Office Action (Final Rejection) dated Aug. 31, 2022 for U.S. Appl. No. 17/144,879 (pp. 1-14).
Office Action (Final Rejection) dated Nov. 14, 2022 for U.S. Appl. No. 16/861,097 (pp. 1-19).
Office Action (Final Rejection) dated Nov. 14, 2022 for U.S. Appl. No. 16/861,100 (pp. 1-19).
Office Action (Non-Final Rejection) dated Jan. 6, 2023 for U.S. Appl. No. 17/144,879 (pp. 1-14).
Office Action (Non-Final Rejection) dated Jan. 13, 2023 for U.S. Appl. No. 16/518,501 (pp. 1-21).
Office Action (Non-Final Rejection) dated Jan. 18, 2023 for U.S. Appl. No. 16/518,558 (pp. 1-16).

(56) References Cited

OTHER PUBLICATIONS

Office Action (Non-Final Rejection) dated Sep. 16, 2022 for U.S. Appl. No. 16/937,884 (pp. 1-29).
Office Action (Notice of Allowance and Fees Due (PTOL-85)) dated Feb. 13, 2023 for U.S. Appl. No. 17/190,268 (pp. 1-4).
Office Action (Notice of Allowance and Fees Due (PTOL-85)) dated Sep. 19, 2022 for U.S. Appl. No. 17/144,885 (pp. 1-7).
Office Action (Notice of Allowance and Fees Due (PTOL-85)) dated Nov. 15, 2022 for U.S. Appl. No. 17/190,268 (pp. 1-7).
Office Action (Notice of Allowance and Fees Due (PTOL-85)) dated Dec. 19, 2022 for U.S. Appl. No. 17/190,268 (pp. 1-4).
Robert Ross et al, "Mobile robot mosaic imaging of vehicle undercarriages using catadioptric vision", Control, Automation and Information Sciences (ICCAIS), 2012 International Conference on, IEEE, (Nov. 26, 2012), doi: 10.1109/ICCAIS.2012.6466596, ISBN 978-1-4673-0812-0, pp. 247-252, XP032335072 Abstract Only.
S. R. Sukumar et al, "Under Vehicle Inspection with 3d Imaging", 3D Imaging for Safety and Security, Dordrecht, Springer Netherlands, (Oct. 1, 2007), vol. 35, pp. 249-278, doi:10.1007/978-1-1020-6182-0_11, ISBN 978-1-4020-6181-3, XP055518511.

\* cited by examiner

OBJECT POSE ESTIMATION IN VISUAL DATA

CROSS-REFERENCE TO RELATED APPLICATIONS

The present application is a continuation of and claims priority to U.S. patent application Ser. No. 16/518,570, titled "OBJECT POSE ESTIMATION IN VISUAL DATA", filed Jul. 22, 2019, by Holzer et al., which claims priority under 35 U.S.C. 120 to U.S. Provisional Patent Application No. 62/795,440, titled "AUTOMATIC OBJECT ORIENTATION ESTIMATION IN VISUAL DATA", filed Jan. 22, 2019, by Holzer et al, and which also claims priority under 35 U.S.C. 120 to U.S. Provisional Patent Application No. 62/795,434, titled "EXTRACTION OF STANDARDIZED IMAGES FROM A SINGLE-VIEW OR MULTI-VIEW CAPTURE", filed Jan. 22, 2019, by Holzer et al., all of which are hereby incorporated by reference in their entirety and for all purposes.

DESCRIPTION OF RELATED ART

Visual digital media content is commonly used to analyze objects. However, images of an object may be captured from various viewpoints. Existing techniques can often identify an object represented in an image. Nevertheless, current techniques for determining a pose of the object relative to the camera viewpoint are ineffective. Accordingly, improved techniques determining the pose of the object relative to the camera viewpoint are desired.

OVERVIEW

Provided are various mechanisms and processes relating to the processing of visual media data. According to various embodiments, techniques and mechanisms described herein facilitate pose identification. A plurality of fiducial points in a visual representation of an object may be identified. The visual representation may include one or more images of the object. Each fiducial point may have a respective first location in one or more of the images and may correspond with a respective component of the object. A second location in a three-dimensional (3D) space may be determined for each fiducial point based on the respective location associated with the fiducial point. A 3D skeleton of the object may be determined by connecting the respective second locations in the 3D space via a processor. A pose of the object may be determined based on the 3D skeleton and may be stored the pose on a storage device.

In particular embodiments, the pose may include a roll value, a pitch value, and a yaw value for the object. Alternately, or additionally, the pose may include three translation values identifying a location of the object in the three-dimensional space.

In particular embodiments, the object may be a vehicle, and the 3D skeleton may include a door and a windshield. The fiducial points may include a headlight portion, a rear-view mirror portion, and a wheel portion.

In particular embodiments, the one or more images includes a plurality of images each captured from a different viewpoint, and the pose of the object includes a respective object pose for each of the plurality of images. The visual representation may be a multi-view capture constructed based on inertial measurement unit (IMU) data and navigable in three dimensions.

In particular embodiments, the 3D skeleton may be determined at least in part by applying a neural network trained to predict 3D coordinates of visible portions of objects represented in two-dimensional (2D) images. The fiducial points may be identified at least in part via a neural network trained to segment objects into components and to classify object components.

In some implementations, an object type may be determined based on the visual representation. A pre-determined 3D mesh corresponding with the object type may then be pre-determined. The respective second locations may be determined at least in part based on positioning each fiducial point within the pre-determined 3D mesh.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

DETAILED DESCRIPTION

Figure 1:
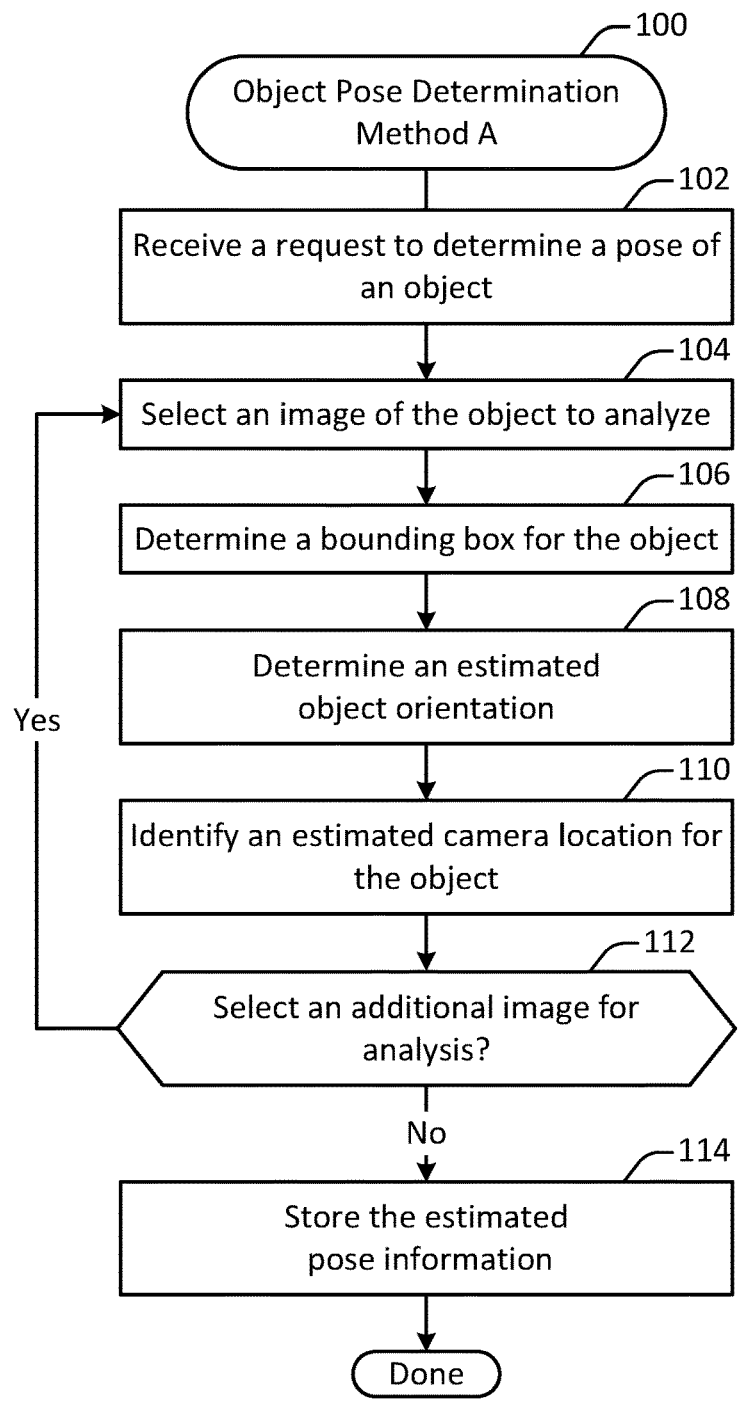
FIG. 1 illustrates a first method for determining object pose, performed in accordance with one or more embodiments.

According to various embodiments, techniques and mechanisms described herein facilitate the identification of the pose of an object represented in visual data. The pose of an object describes how an object is placed in the three-dimensional (3D) space it occupies. An object's pose may be determined with respect to a viewpoint, such as a camera viewpoint. The object's pose may include three dimensions of information characterizing the object's rotation with respect to the camera viewpoint. Alternately, or additionally, an object's pose may include three dimensions of information characterizing the object's translation with respect to the camera viewpoint. The object's pose may be useful for describing the rotation required to move the object from a reference perspective to a different perspective. It is also useful to orient visualizations of different objects of the same type consistently.

According to various embodiments, techniques and mechanisms described herein provide for a pose determination system. The system includes a pose determination application which in some embodiments may be implemented on a mobile computing device running an operating system such as iOS or Android. The pose determination application may provide a simple experience for users to capture the pose of an object. The pose determination application may include an upload process, which may run in the background. In some implementations, the pose data for an object may include information such as the object's roll, pitch, yaw, elevation, angular position, height, translation (e.g., in three dimensions), and/or attitude. Alternately or additionally, pose data for an object may include information about the azimuth angle of the object, which may include information about the horizontal angle of the object measured from a fixed reference plane or established base direction line.

According to various embodiments, the pose determination procedures described herein may provide improved techniques for determining the pose of an object from visual data. The pose of an object may be obtained from a single image. Alternately, or additionally, the pose of an object may be obtained from a multi-view capture or a video.

For the purpose of illustration, several applications of pose determination are described herein in relation to images of vehicles. For example, in the case of a vehicle, the pose of the vehicle may be used to facilitate vehicle identification. Identifying a designated vehicle, and determining visual information such as its condition or damage sustained, is more easily accomplished if the vehicle's pose is known. A user may walk around the vehicle to inspect it from multiple viewpoints. A user may then manually annotate on a single image or multi-view image the location of the damage present on the rented vehicle. For instance, pose may be used to identify a vehicle or characterize damage to a vehicle as part of a vehicle rental or purchase process.

As another example, the pose of a vehicle can be used in visual tagging, where the user clicks on a single image to set a tag and the same tag then appears on other captured visual images of the vehicle or vice versa. In this way, the pose of the vehicle can also be used to position a tag in an image from one viewpoint of the vehicle, rotate the image to another viewpoint of the vehicle and project the tag to that viewpoint, and then project it back to all other captured viewpoints of the vehicle where it would be visible. Such an approach allows for robust tagging of a 360-degree object visualization, for example to facilitate the rental or purchase of the vehicle.

As yet another example, a pose of a vehicle may be used to facilitate visual tagging with persistent tag locations across different locations across different object visualizations. For example, in the case of a vehicle, a user such as a vehicle dealership agent may wish to always locate tags at certain locations on a vehicle, such as one of the wheels or at the engine. In this case, the user can specify these general tags in an image from one viewpoint of the vehicle and then captures at different poses may automatically receive a tag at that location. Alternately, a user can specify these general tags in a 360-degree reference view, which may be mapped back onto images taken from various viewpoints of the vehicle.

As still another example, a pose of a vehicle may be used to facilitate the identification of standard views. Additional details regarding the identification of standard views are discussed with respect to FIGS. 7 and 8.

FIG. 1 illustrates a method 100 of determining a pose of an object, performed in accordance with one or more embodiments. The method 100 may be performed on any suitable computing device. For example, the method 100 may be performed on a mobile computing device such as a smart phone. Alternately or additionally, the method 100 may be performed on a remote server in communication with a mobile computing device.

A request to determine a pose of an object is received at 102. According to various embodiments, the request may be received at a user interface. For example, the request may be received via an application at a mobile computing device. As another example, the request may be received at a user interface at a laptop.

At 104, an image of the object is selected for analysis. According to various embodiments, the image may be a single two-dimensional image of the object. Alternately or additionally, the image may be one of a series of two-dimensional images of the object captured from different viewpoints. In some implementations, the image may be a single frame of a video stream of the object.

In some embodiments, the image may be a 360-degree multi-view capture of the object. Alternately, the image may include a view that has less than 360-degree coverage. Additional details regarding multi-view data collection, multi-view representation construction, and other features are discussed in co-pending and commonly assigned U.S. patent application Ser. No. 15/934,624, "Conversion of an Interactive Multi-view Image Data Set into a Video", by Holzer et al., filed Mar. 23, 2018, which is hereby incorporated by reference in its entirety and for all purposes.

Optionally, a bounding box for the object is determined at 106. According to various embodiments, a bounding box for the object may include coordinates of a rectangular or non-rectangular border that encloses the object in the selected image. The bounding box may be determined by a neural network. For example, a neural network may be trained to determine the coordinates of the visible object pixels in an image of the object. The neural network may facilitate the determination of the pixel coordinates and the width, height, or other characteristics of the bounding box enclosing the object. Alternately or additionally, the bounding box may be determined by a different type of algorithm. In some configurations, the bounding box may be determined at least in part based on user input. For example, the bounding box may be determined by a user super-imposing a border on the image to enclose the object. In another example, the bounding box may be determined by the user tapping on the object with an algorithm automatically estimating the extent of the bounding based on the selection. In yet another example, the user may select points or regions in the foreground and background, and an algorithm automatically separates both to estimate the extent of a corresponding bounding box.

At 108, an estimated object orientation is determined. According to various embodiments, the estimated object orientation may be determined by a neural network. For example, a neural network may be trained to determine the estimated object orientation through an analysis of the object from one or more images of an object. The estimated object orientation may include estimates about an object's roll, elevation, angular position, attitude, and azimuth angle.

An estimated camera location is identified at 110. According to various embodiments, camera location may be estimated from data collected from an inertial measurement unit (IMU). In some implementations, the IMU may be associated with a mobile computing device, such as a smartphone.

For example, a mobile computing device may include sensors such as a camera capable of capturing visual data such as an image or video stream. A mobile computing device may also include an accelerometer, a gyroscope, and other such sensors capable of capturing IMU data.

In some implementations, IMU data may be used to identify pose information associated with the camera. For example, the IMU data may indicate that the image was captured with a camera located at a particular height and angle relative to the object and/or ground. Alternatively, or additionally, the pose estimation might be done using a pose estimation algorithm based on image data. In some configurations, the pose estimation method might also consider the available IMU data.

In particular embodiments, an offset between the estimated object pose and the estimated camera location may be determined. According to various embodiments, the determination may be made at least in part by identifying a difference between the two values. Alternately, or additionally, the determination may be made at least in part by refining the object pose based on additional information characterizing the position and angle of the camera.

A determination is made at 112 as to whether to select an additional image of the object for analysis. In some implementations, additional images may be selected until all available images have been analyzed. For example, each image associated with a multi-view capture may be analyzed. If multiple images have been processed, then a combined offset may be to be calculated. For example, the offset can be averaged from the results obtained from multiple images. In another example, a robust method for estimating the final offset from multiple computed offsets might be used, for instance to handle outliers such as an inaccurate pose estimation for certain images.

In some embodiments, the determination made at 112 may be made at least in part automatically. For example, the estimated object pose procedure at 108 may attempt to estimate a pose for the object, but may fail due to incomplete image information or other information. A determination may be automatically made to prompt the user to capture or upload additional images of the object.

In some implementations, the determination made at 112 may be made at least in part as a request by a user. For example, a user may be prompted to select an additional image for analysis. Alternately or additionally, a user may be prompted to review an estimated object pose, and a user may review the estimated object pose and may elect to analyze additional images of the object in order to improve the accuracy or quality of the estimated object pose. In some implementations, every N-th frame of the multi-view capture might be processed.

At 114, the pose estimation information is stored. According to various embodiments, storing the pose estimation information may involve storing one or more pose values for each of the images analyzed in FIG. 1. For example, pose information may be stored to supplement a multi-view capture.

In some implementations, the pose estimation may be stored on a storage device. Alternatively, or additionally, the pose estimation may be transmitted to a remote location via a network.

Figure 2:
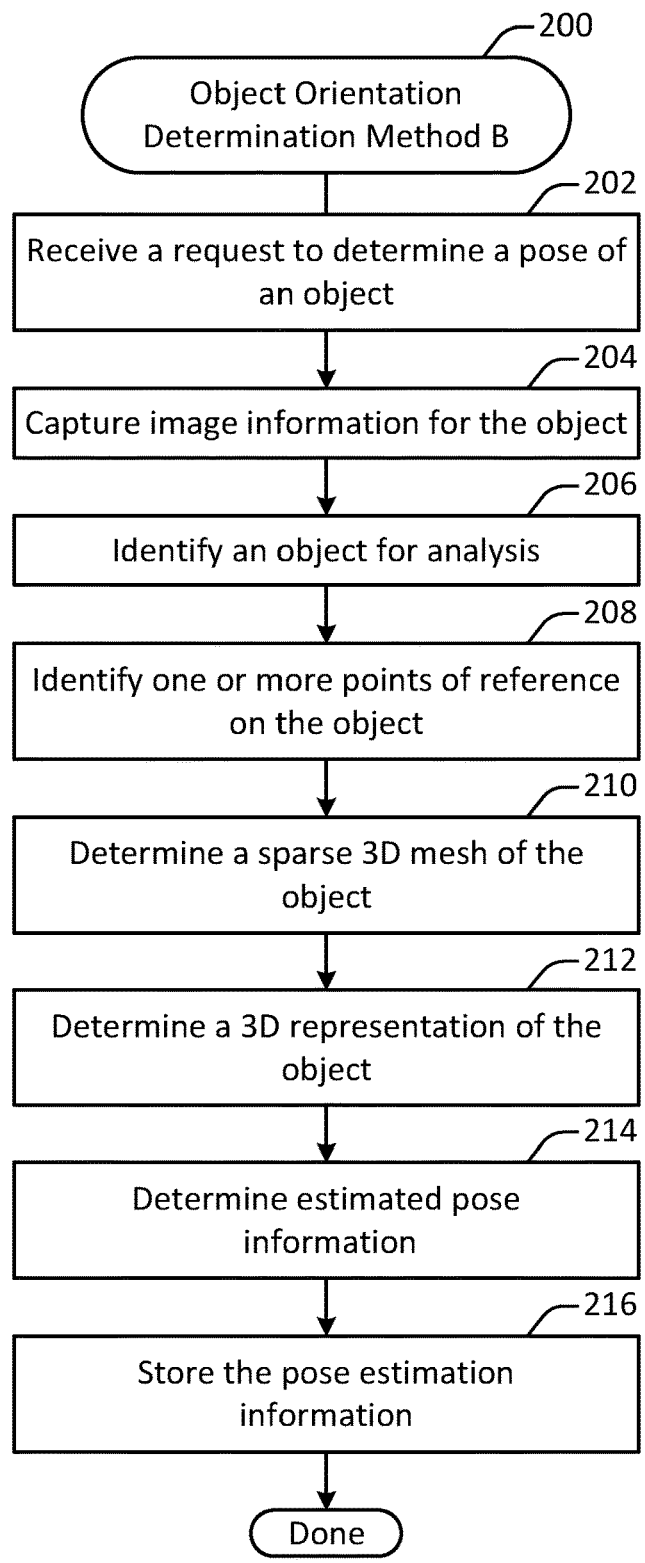
FIG. 2 illustrates a second method for determining object pose, performed in accordance with one or more embodiments.

FIG. 2 illustrates a method for determining an object pose based on 3D data. The method 200 may be performed on any suitable computing device. For example, the method 200 may be performed on a mobile computing device such as a smart phone. Alternatively or additionally, the method 200 may be performed on a remote server in communication with a mobile computing device.

A request to determine a pose of an object is received at 202. In some implementations, the request may be received at a user interface. At 204, image information for the object is captured. In some implementations, the image information may include a video or image set of the object is captured from multiple perspectives. The image information may include a 360-degree view of the object. Alternately, the image information may include a view that has less than 360-degree coverage.

An object is identified for analysis at 206. In some embodiments, the object may be identified via an algorithm. For example, the object may be identified via an image recognition algorithm. As another example, the object may be identified via a bounding box algorithm.

In some implementations, the object may be identified based at least in part on user input. For instance, a user may identify the object as a vehicle via a user interface component such as a drop-down menu.

At 208, one or more points of reference are identified on the object. According to various embodiments, points of reference may include one or more fiducial points on the object. Fiducial points are identifiable locations on objects of a particular type that in general should be present on all or nearly all objects of that type and that provide an indication as to the object's pose. For example, in the case of a vehicle, fiducial points may include but are not limited to the vehicle's headlights, rearview mirror, and wheels.

In some implementations, the reference points may be identified via an algorithm, such as an image recognition algorithm. Alternately or additionally, reference points may be identified in part through user input.

A sparse 3D mesh of an object is determined at 210. According to various embodiments, the sparse 3D mesh may be determined by using the fiducial points identified in operation 208 as vertices of the mesh. For example, each face of the mesh may approximate the object shape with a planar surface.

At 212, a 3D representation of the object is determined. According to various embodiments, the 3D representation may be constructed by elevating the fiducial points to 3D space and constructing a sparse 3D mesh from their locations. Alternately, or additionally, the object's pose may be inferred based on cues such as surface normal of the faces of the mesh, visibility states of the fidicual points in a plurality of image, or other such features.

In some embodiments, the elevation into 3D space might be done using triangulation. Alternately, or additionally, a depth map might be computed for each frame which is then used to elevate the 2D points into 3D.

According to various embodiments, the 3D representation may be a 3D skeleton. For example, 2D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from one or more 2D skeletons and/or one or more 3D models. Additional details regarding skeleton detection are discussed in co-pending and commonly assigned U.S. patent application Ser. No. 15/427,026, titled "Skeleton Detection and Tracking via Client-server Communication" by Holzer et al, filed Feb. 7, 2017, which is hereby incorporated by reference in its entirety and for all purposes.

According to various embodiments, the 3D reconstruction of the object surface may include one or more of a variety of reconstruction procedures. For example, dominant axes may be computed to estimate pose. As another example, an object model such as a vehicle model that has a reference pose may be fit into a 3D reconstructed model based on the input data. As another example, one or more parts of a 3D reconstructed model may be classified to estimate a pose of the object.

Estimated pose for the object is determined at 214. According to various embodiments, the estimated object pose may be determined by a neural network. For example, a neural network may be trained to determine the estimated object pose through an analysis of the object from one or more images of an object. The estimated object pose may include estimates about an object's dominant axes, roll, elevation, angular position, attitude, and azimuth angle.

According to various embodiments, the object pose may be estimated based on the sparse 3D mesh determined at operation 210 and/or the 3D skeleton determined at operation 212. For example, the fiducial points identified in operation 208 facilitate the triangulation of fiducial points of the object in 3D space to help determine the azimuth, roll, elevation, and axes of the designated object. The 3D skeleton may facilitate the inference of the object's pose based on cues such as, but not limited to, the surface normals of the faces of the mesh, and the visibility states of the fiducial points in the images of the object, and information about the three axes of the 3D skeleton model determined at operation 212.

In some embodiments, the estimated object pose may be determined based on a 3D reconstruction of the object. For example, the object pose may be estimated based on the dominant axes of the 3D reconstruction of an object. As another example, the pose for a designated object may be estimated by incorporating the pose of a known reference object with reference pose with a 3D reconstructed model of the designated object. As yet another example, parts of the 3D reconstructed model may be identified to determine pose of the object. For example, in the case of a vehicle, the license plate may be identified as a reference point relative to the rearview mirror to estimate the pose of the vehicle.

At 216, the pose estimation information is stored. In some implementations, the pose estimation may be stored on a storage device. Alternately, or additionally, the pose estimation may be transmitted to a remote location via a network.

According to various embodiments, the object pose may be estimated based on the determination of specific reference points on the object. For example, in the case of a vehicle, a specific reference point such as the license plate may be detected in one or more images of a multi-view image set. Based on the location of the license plate in the image relative to other reference points, such as the vehicle's headlights, the pose of the object may be inferred.

In some implementations, this determination may be performed on a 3D model of the object. For example, for a 3D model of a vehicle, the location of the license plate may be used to estimate global angle for the vehicle. Alternately, or additionally, the trajectory of a feature such as a license plate may be fit to an ellipse in image space, which corresponds to a sphere around the vehicle in 3d space, and the location on the ellipse is used to estimate the vehicle's pose.

In some embodiments, the estimated object pose may be determined from a single image. In some implementations, the object may not be visible from all angles or perspectives from a single image, or an image may not supply a minimum number of reference points visible to determine a sparse 3D mesh capable of facilitating the determination of a 3D skeleton of the object. In such situations, a neural network may be trained to predict coordinates of the visible object pixels in a top-down view of the object.

In particular embodiments, once the locations are mapped, the points may be lifted to 3D based on a predefined correspondence between the top-down view and a 3D mesh. Then, the transformation between the image points and the 3D mesh may be used to obtain the pose of the vehicle. Alternately, or additionally, the 3D mesh may also be predicted by a neural network, with the orientation determined by joint reasoning.

According to various embodiments, the estimated object pose may be determined from a single image via top-down view mapping. For example, a network may be trained that takes an image of an object such as a vehicle as input and maps every point of the image onto a top-down view. Based on the distribution of the points on the top-down view, the system may then draw an inference about the pose of the object with respect to the camera.

According to various embodiments, pose may be estimated from a single image using a component classifier. For example, a network may be trained to identify object components such as car parts. For instance, each pixel of the image may be classified as belonging to an object component or as part of the background. The visible object components may then be used to estimate a pose of the object.

According to various embodiments, the object pose may be directly estimated from the detected 2D skeleton by considering which joints of the 2D skeleton are detected (i.e. are visible).

In some implementations, the estimated object pose may be determined from a single image via using a neural network trained directly to determine an N degree-of-freedom pose. For example, a 3 degree-of-freedom pose may include azimuth, roll, and elevation. As another example, a 6 degree-of-freedom pose may include 3 degrees of freedom for orientation and 3 degrees of freedom for translation. As another example, any combination of degrees of freedom may be used. For instance, a 2 degree-of-freedom pose may include 1 degree-of-freedom for orientation and 1 degree-of-freedom for the distance between the camera and the object.

In particular embodiments, any of the approaches involving a single image may be applied on a multi-view data set and the results combined (e.g., averaged) to improve the overall results. In general, any combination of the methods described herein may be used to increase robustness and/or provide a failsafe. For example, pose may be independent estimated using three different methods, and then the results cross-checked.

Figure 3:
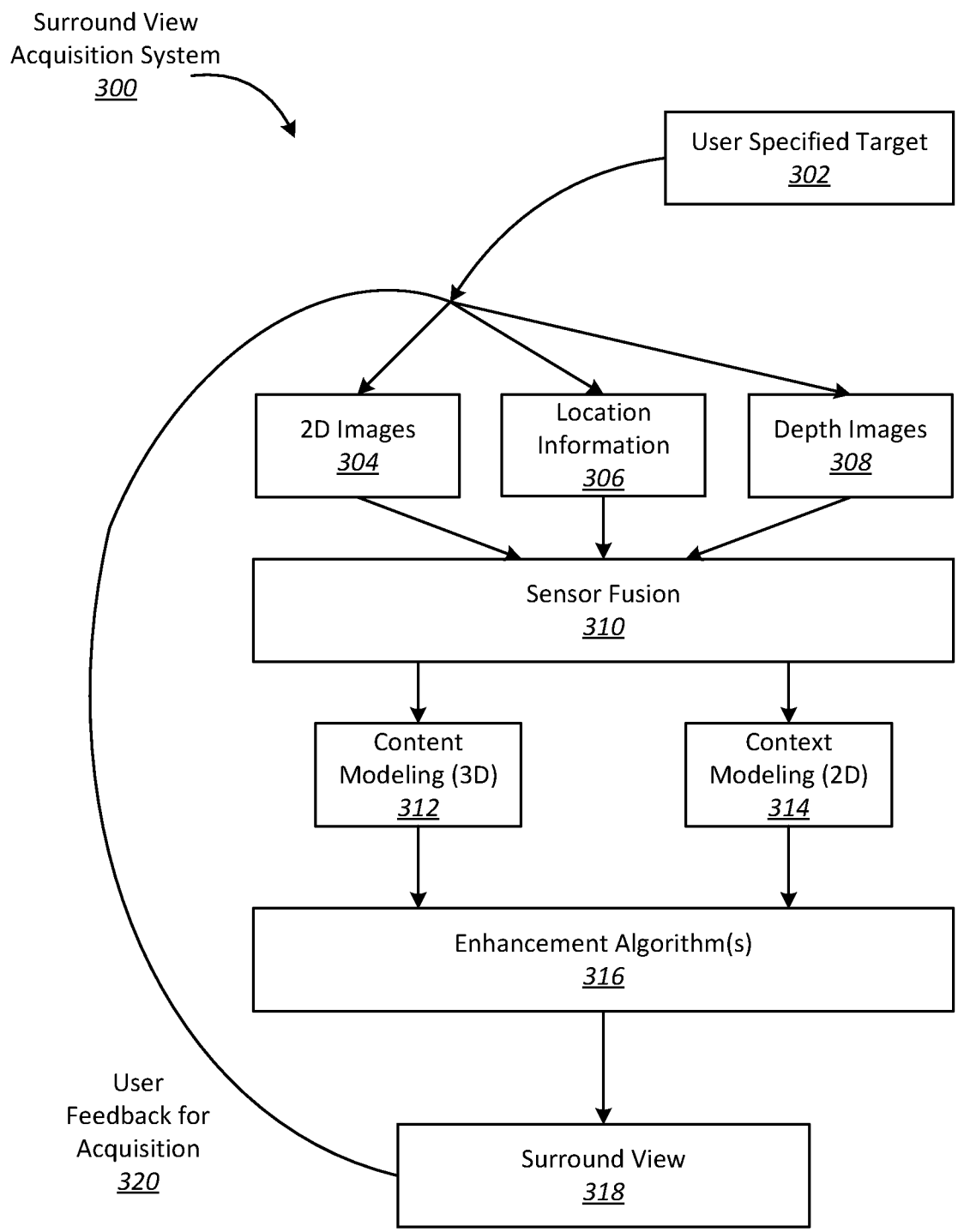
FIG. 3 illustrates an example of a surround view acquisition system configured in accordance with various embodiment.

With reference to FIG. 3, shown is an example of a surround view acquisition system that can be used to generate a multi-view interactive digital media representation that can be used for the application of filters or visual effects. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 300 is depicted in a flow sequence that can be used to generate a surround view. According to various embodiments, the data used to generate a surround view can come from a variety of sources. In particular, data such as, but not limited to two-dimensional (2D) images 304 can be used to generate a surround view. These 2D images can include color image data streams such as multiple image sequences, video data, etc., or multiple images in any of various formats for images, depending on the application. Another source of data that can be used to generate a surround view includes location information 306. This location information 306 can be obtained from sources such as accelerometers, gyroscopes, magnetometers, GPS, Wi-Fi, IMU-like systems (Inertial Measurement Unit systems), and the like. Yet another source of data that can be used to generate a surround view can include depth images 308. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 310. In some embodiments, a surround view can be generated a combination of data that includes both 2D images 304 and location information 306, without any depth images 308 provided. In other embodiments, depth images 308 and location information 306 can be used together at sensor fusion block 310. Various combinations of image data can be used with location information at 306, depending on the application and available data.

In the present example embodiment, the data that has been fused together at sensor fusion block 310 is then used for content modeling 312 and context modeling 314. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 312 and context modeling 314 can be generated by combining the image and location information data. Content modeling may include operations such as object pose determination.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 302 can be chosen. It should be noted, however, that a surround view can be generated without a user specified target in some applications.

In the present example embodiment, one or more enhancement algorithms can be applied at enhancement algorithm(s) block 316. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 316. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 318 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in applying filters or visual effects.

According to various example embodiments, once a surround view 318 is generated, user feedback for acquisition 320 of additional image data can be provided. In particular, if a surround view is determined to need additional views to provide a more accurate model of the content or context, a user may be prompted to provide additional views. Once these additional views are received by the surround view acquisition system 300, these additional views can be processed by the system 300 and incorporated into the surround view.

Figure 4:
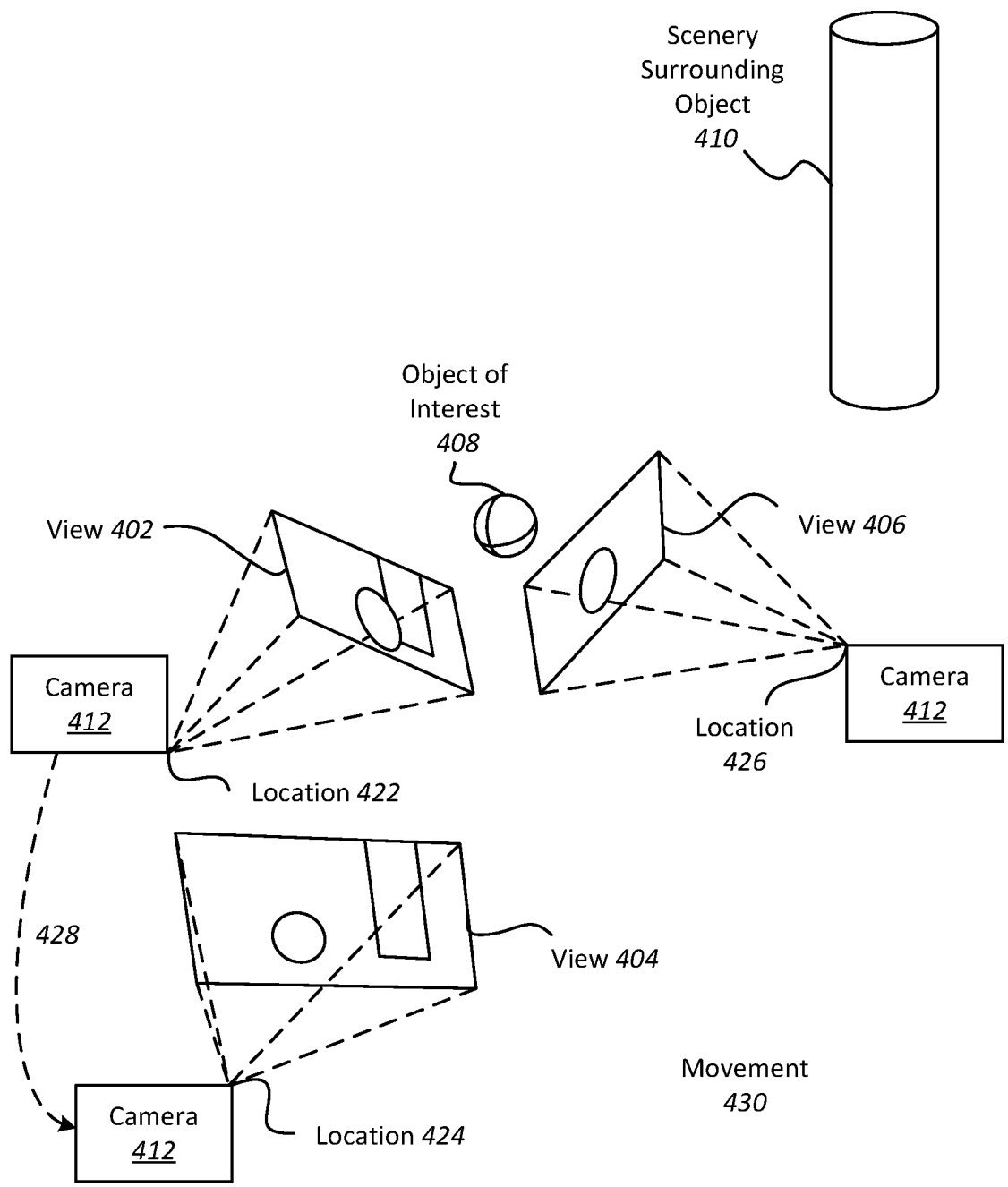
FIG. 4 illustrates an example of a device capturing multiple views of an object of interest.

With reference to FIG. 4, shown is an example of a device capturing multiple views of an object of interest from different locations. The capture device is indicated as camera 412, and moves from location 422 to location 424 and from location 424 to location 426. The multiple camera views 402, 404, and 406 captured by camera 412 can be fused together into a three-dimensional (3D) model. According to various embodiments, multiple images can be captured from various viewpoints and fused together to provide a multi-view digital media representation.

In the present example embodiment, camera 412 moves to locations 422, 424, and 426, respectively, along paths 428 and 430, in proximity to an object of interest 408. Scenery can surround the object of interest 408 such as object 408. Views 402, 404, and 406 are captured by camera 412 from locations 422, 424, and 426 and include overlapping subject matter. Specifically, each view 402, 404, and 406 includes the object of interest 408 and varying degrees of visibility of the scenery surrounding the object 408. For instance, view 402 includes a view of the object of interest 408 in front of the cylinder that is part of the scenery surrounding the object 408. View 404 shows the object of interest 408 to one side of the cylinder, and view 406 shows the object of interest without any view of the cylinder.

In the present example embodiment, the various views 402, 404, and 406 along with their associated locations 422, 424, and 426, respectively, provide a rich source of information about object of interest 408 and the surrounding context that can be used to produce a multi-view digital media representation, such as a surround view. For instance, when analyzed together, the various views 402, 404, and 406 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 408 into content and the scenery 410 as the context. In particular examples, the content can then be used for applying filters.

Figure 5:
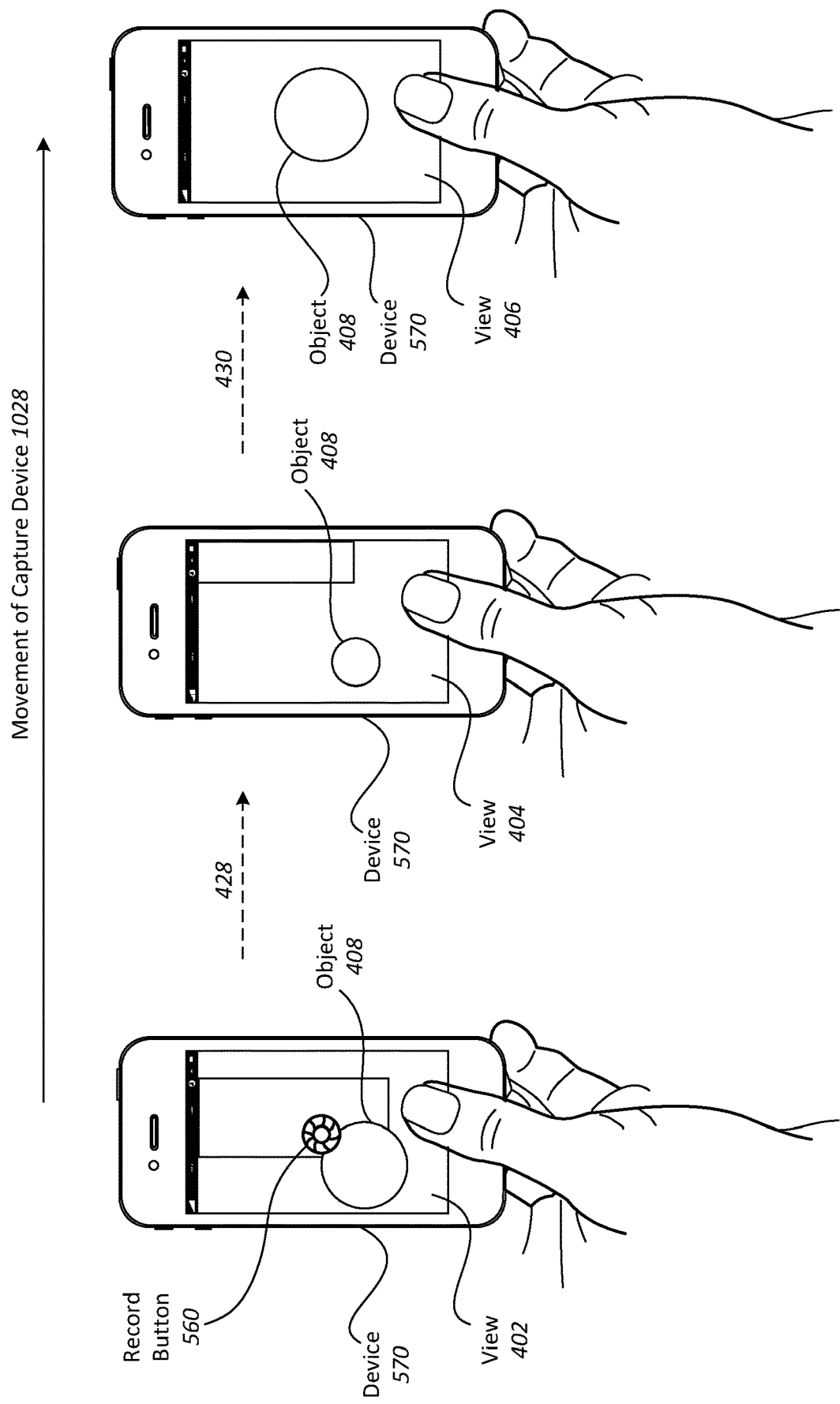
FIG. 5 illustrates an example of a device capturing views of an object of interest to create a multi-view media representation to which a filter may be applied.

With reference to FIG. 5, shown is an example of a device capturing views of an object of interest. During a filter session, multiple views of the object 408 may be captured by the device 570 from different locations. In the present example, data is acquired when a user taps a record button 580 on capture device 570 to begin recording images of the object.

The user moves 428 the capture device 570 from location 422 to location 424 along path 428 and from location 424 to location 426 along path 430. As described in more detail throughout this application, filtering can be provided at the device 570, and prompts for the user to capture particular views can be provided during the session. In particular, the system can prompt the user to move the device 570 in a particular direction or may prompt the user to provide additional information. As the user records different views of the object, filtering suggestions may be reiteratively refined to provide accurate results. The user may choose to stop recording by tapping the record button 580 again. In other examples, the user can tap and hold the record button during the session, and release to stop recording. In the present embodiment, the recording captures a series of images that can be used to generate a multi-view digital media representation that can be for filtering either in real-time or after-the-fact.

In some implementations, applying a filter to a multi-view digital media representation may involve processing a succession of images taken from different perspectives. In such an example, the client device may perform low-level processing such as two-dimensional analysis of individual images. The server, on the other hand, may perform high-level processing such as combining different individual images to produce a three-dimensional model of an object that is the subject of a multi-view video.

Figure 6:
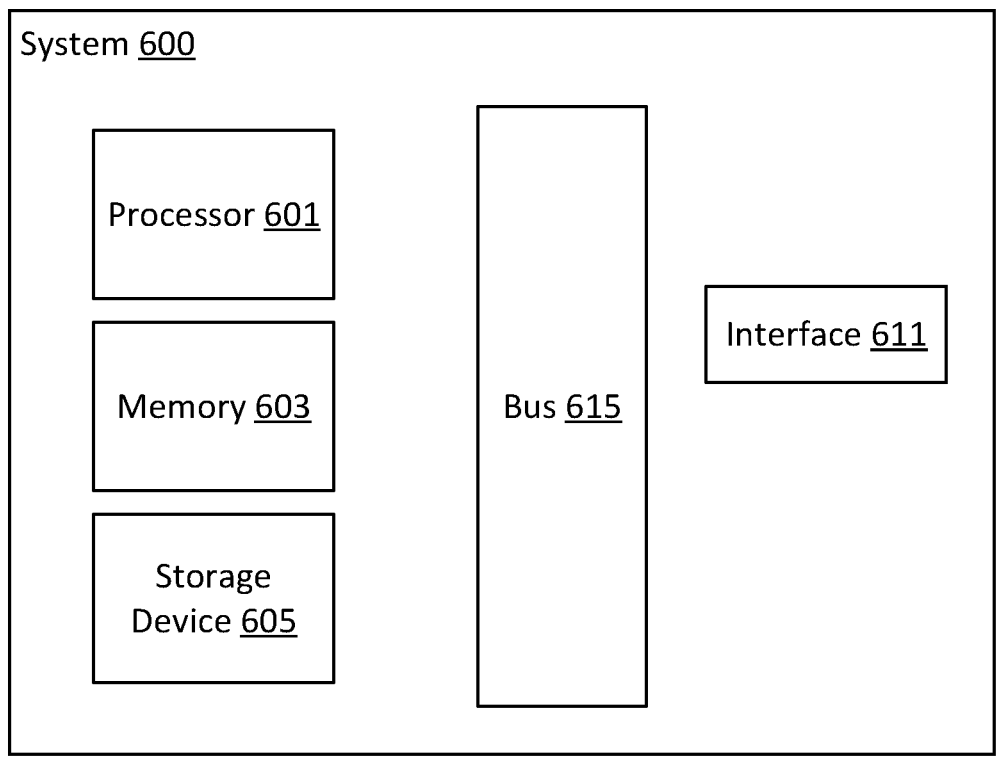
FIG. 6 illustrates a particular example of a computer system configured in accordance with various embodiment.

With reference to FIG. 6, shown is a particular example of a computer system that can be used to implement particular examples of the present invention. For instance, the computer system 600 can be used to map views between images according to various embodiments described above. The computer system 600 may be, for example, a server, a client machine, a mobile phone, a laptop, a desktop computer, or any other suitable device. According to particular example embodiments, a system 600 suitable for implementing particular embodiments of the present invention includes a processor 601, a memory 603, a communications interface 611, and a bus 615 (e.g., a PCI bus). The interface 611 may include separate input and output interfaces, or may be a unified interface supporting both operations. When acting under the control of appropriate software or firmware, the processor 601 is responsible for such tasks such as optimization. Various specially configured devices can also be used in place of a processor 601 or in addition to processor 601.

The complete implementation can also be done in custom hardware. The communications interface 611 is typically configured to send and receive data packets or data segments over a network. Particular examples of interfaces the device supports include Ethernet interfaces, frame relay interfaces, cable interfaces, DSL interfaces, token ring interfaces, and the like. The storage device 605 is configured to store information on one or more non-transitory storage media such as a hard disk or network attached storage system.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 7:
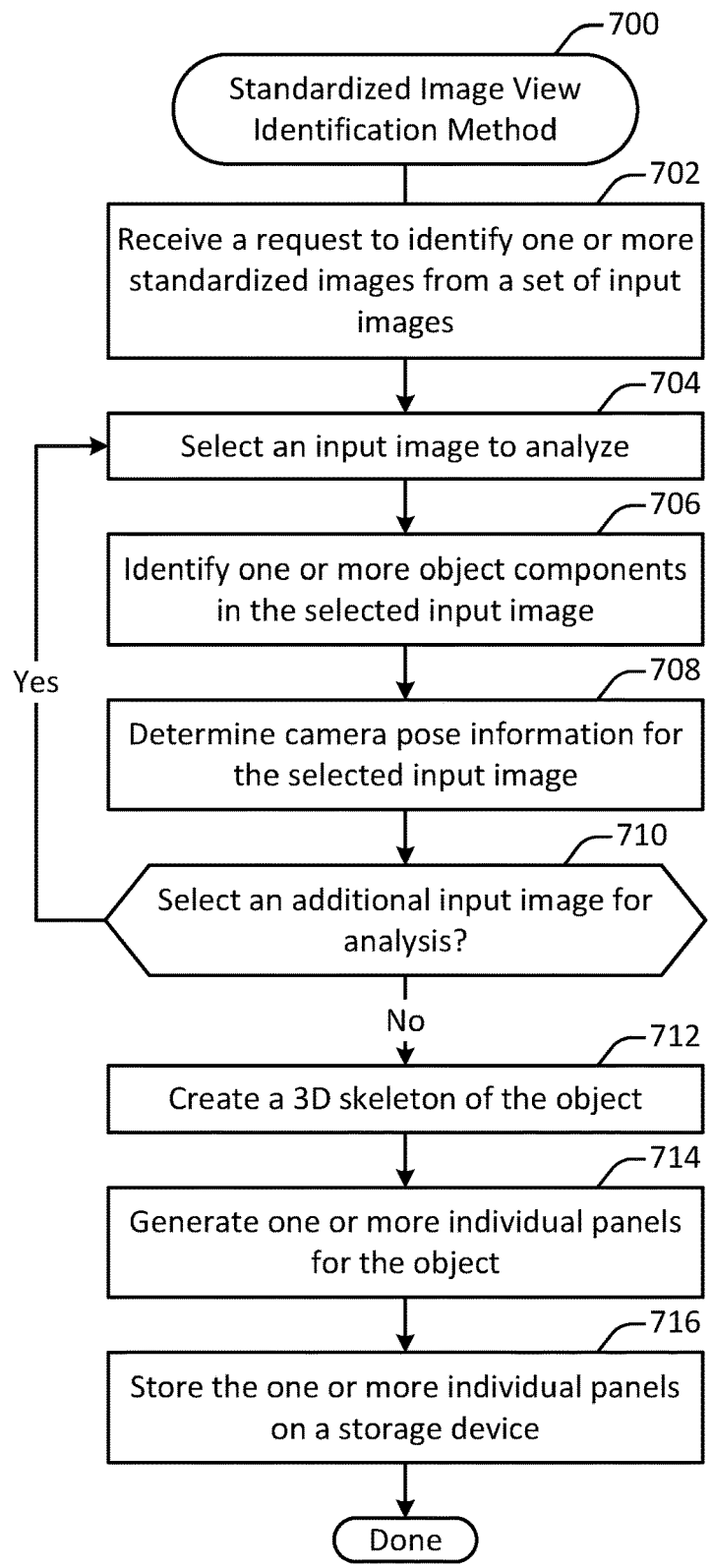
FIG. 7 illustrates a method for standardized image view identification, performed in accordance with one or more embodiments.

FIG. 7 illustrates a method 700 for standardized image view identification, performed in accordance with one or more embodiments. According to various embodiments, the method 700 may be performed on a computing device such as a client machine or remote server. As discussed herein, object pose detection may be used to facilitate operations such as standardized image view identification.

At 702, a request is received to identify one or more standardized images from a set of input images. In some implementations, the input images may be captured by a conventional camera. Alternately, the input images may be captured by a smartphone camera. According to various embodiments, the set of images may be included in a multi-view capture.

In some embodiments, the input images may include supplementary data such as data collected from an inertial measurement unit (IMU). Such data may include measurements originating from a gyroscope and/or an accelerometer such as orientation, location, and/or acceleration information.

An input image is selected for analysis at 704. According to various embodiments, images may be selected for analysis in sequence, in parallel, at random, or in any suitable order.

One or more object components in the selected image are identified at 706. In some implementations, an object component may be identified at least in part via a neural network. For example, the selected image may be used as an input to a neural network which was trained on domain-specific data and identifies points on each image that locate salient parts of the images. When used on vehicles for example, the network may be trained to recognize wheels, lights, and parts of the frame.

According to various embodiments, the identification of object components may yield one or more annotated images. In an annotated image, identified components may be mapped to 2D coordinates and/or frame numbers within the image-set.

Figure 8:
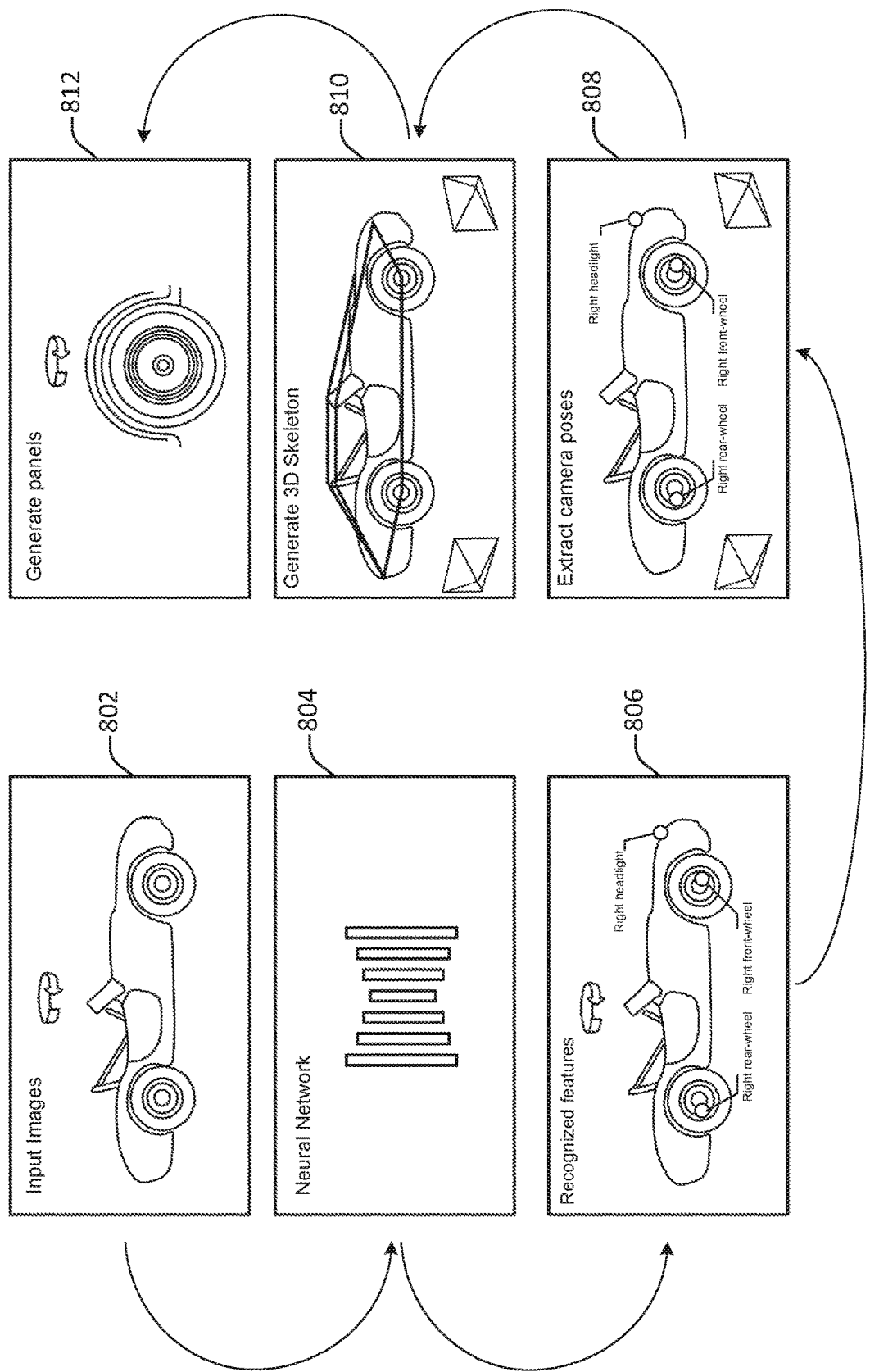
FIG. 8 illustrates an example of an object component identification procedure, performed in accordance with one or more embodiments.

An example of an object component identification procedure is shown in FIG. 8. An input image at 802 is provided as input to a neural network 804, which results in an annotated image with identified components at 806.

Camera pose information for the selected input image is determined at 708. According to various embodiments, the camera poses may be extracted using a computer vision algorithm. Additional details regarding the determination of pose (also referred to herein as viewpoint) are discussed throughout the application, for instance with respect to FIGS. 1 and 2.

According to various embodiments, camera pose information may be estimated for a viewpoint in order to associate each image in a sequence of images with a viewpoint. Camera-poses may be estimated by an algorithm that uses the images and, optionally, additional information received from the capturing device. Such information may include angle, location, acceleration, velocity, or other such data collected from a gyroscope, an accelerometer, or other such sensor associated with the camera. The collection of one or more such sensors in a device is referred to herein as an inertial measurement unit (IMU), and the data collected from such sensors is referred to as IMU data. Such input data may be used to facilitate the determination of camera pose information using a bundle adjustment procedure. The estimated poses provide information about the relative position of the camera towards the object of interest.

An example of camera pose detection is shown at 808. Based on information such as the location of the image components (e.g., the right rear wheel, the right front wheel, and the right headline), the system may determine that the image was captured from a designated location on the right side of the vehicle.

A determination is made at 710 as to whether to select an additional input image for analysis. According to various embodiments, images may continue to be selected for analysis until all images have been analyzed. Alternately, images may continue to be selected until each of a designated set of standardized images have been selected.

A 3D skeleton of the object is created at 712. According to various embodiments, creating a 3D skeleton may involve using the location of the components in the image set identified at 706 along with the camera pose information determined at 706. The skeleton computed in 3D space may be projected to the frames of the image-set by using the inferred 3D positions and camera poses. An example of 3D skeleton generation is shown in 810 in FIG. 8.

One or more individual panels for the object are generated at 714. In some implementations, based on information such as on the three-dimensional skeleton and the camera poses, the system may generate a set of standardized images using a domain-specific rule set. The domain-specific rule set may designate one or more viewpoints.

In some embodiments, the domain-specific rule set may also designate a region crop associated with a viewpoint. The region crop may identify a portion of a component to include in a standardized image associated with the viewpoint.

According to various embodiments, each individual panel may include one or more views of the object or parts of the object. A panel may include an entire image selected from the set of input images. Alternately, the panel may include a cropped portion of one or more images.

An example rule for generating a panel of a front wheel of a vehicle may be defined as follows. In the following pseudocode, the front wheel positioned is determined by first identifying images with a suitable top-down viewing angle. Then, the wheel position is identified, and the crop area determined based on the wheel location in the image and the distance between the front and back wheel. An example of an application of such a rule is shown at 812 in FIG. 8. The image at 812 shows a standardized view of the front wheel.

```
RULE generate_front_wheel_panel:
    FORALL poses WITH top_down_angle BETWEEN
        (60°,120°):
        img=GET_IMAGE_OF_POSE(pose)
        p=GET_WHEEL_POSITION_ON_POSE(pose)
        cx=0.3*HDISTANCE(pose,FRONT_WHEEL,
            BACK_WHEEL)
        cy=0.4*VDISTANCE(pose,FRONT_WHEEL,
            FRONT_ROOF)
        ADD_TO_PANEL(CROP(img,p,cx,cy))
```

In particular embodiments, a number of standardized views of a single component may be combined to create a localized multi-view of that component. For example, standardized views of the front wheel shown at 812 may be captured from different viewpoints, and these different standardized viewpoints may be combined to create a multi-view of the wheel.

In some implementations, a machine learning algorithm may be trained to detect a bounding box around a component of an object (e.g., a part or panel of a vehicle) that is to be represented via a standardized image. After estimating the bounding box for a specific component in an input image or in a multi-view representation, the area within the bounding box may be extracted and presented as a result. In particular embodiments, such techniques may be applied to object interiors as well as object exteriors.

The one or more individual panels are stored on a storage device at 716. According to various embodiments, the panels may be stored as a newly-created image-set. Alternately, or additionally, the panels may be stored as an image-sequence which may be subject to video playback. In some implementations, the one or more individual panels may be transmitted to a remote location via a network, such as to a remote server or to a client machine.

According to various embodiments, the operations performed in FIG. 7 or in other methods described herein may be used to extract standardized views from a video. For example, a 360-degree view of a vehicle may be used as input to extract views of the vehicle at 45-degree angles around the vehicle. In such a configuration, a crop of the image may contain the entire object. The bounding box of the object inside the image may be obtained at least in part with a neural network for object detection. Alternately, the bounding box of the object inside the image may be obtained at least in part directly from the 3D skeleton determined at 712, which may be re-projected onto one or more frames.

According to various embodiments, one or more of the operations shown in FIG. 7 or in other methods described herein may be performed in an order different than that shown. For example, camera pose information may be determined at 708 before, after, or in parallel to the identification of the one or more object components at 706.

The method 700 is described as involving the estimation of a 3D skeleton of an object. However, according to various embodiments, a 2D skeleton may be estimated from an input image or from each viewpoint of a multi-view representation. Then, the areas to extract may be defined relative to the joint locations of the skeleton. The joint locations may be treated as salient keypoints that a machine learning algorithm is trained to detect.

According to various embodiments, the method 700 shown in FIG. 7 and other methods described herein may be applied to capture viewpoints from the interior of an object.

In particular embodiments, when the input data includes a multi-view representation, points near the locations that are to be extracted may be tracked across images. Such point tracking may facilitate the smoothing of the location of the area to extract and/or the construction of a multi-view crop that is more stable than would otherwise be the case.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

The invention claimed is:

1. A method comprising:
identifying via a processor a plurality of fiducial points by applying a neural network to a plurality of two-dimensional (2D) images of a vehicle, the 2D images being captured from respective camera viewpoints by a handheld visible light camera as the handheld visible light camera moves along a path through space, each fiducial point corresponding with a respective first one or more locations in the 2D images;
determining via the processor a respective second location in a three-dimensional (3D) coordinate space for each fiducial point based on the first one or more locations;
determining via the processor a 3D skeleton of the vehicle based at least in part on the second locations in the 3D coordinate space;
determining via the processor a pose of the vehicle for a designated camera viewpoint based on the 3D skeleton;
using the pose, automatically generating a panel of a component of the vehicle, the panel comprising a plurality of views of the component of the vehicle; and
causing the panel to be stored on a storage device.

2. The method recited in claim 1, the method further comprising:
determining a respective bounding box around the object for one or more of the plurality of 2D images.

3. The method recited in claim 1, wherein the pose includes a roll value, a pitch value, and a yaw value for the object relative to the designated camera viewpoint.

4. The method recited in claim 1, wherein the pose includes three translation values identifying a location of the object in the 3D coordinate space relative to the designated camera viewpoint.

5. The method recited in claim 1, wherein the object is a vehicle, and wherein the 3D skeleton includes a door and a windshield.

6. The method recited in claim 5, wherein the fiducial points include a headlight portion, a rear-view mirror portion, and a wheel portion.

7. The method recited in claim 1, wherein the neural network is pretrained to segment objects into components.

8. The method recited in claim 1, wherein the neural network is pretrained to classify object components.

9. The method recited in claim 1, the method further comprising:
determining an object type by applying an object recognition network to one or more of the plurality of 2D images.

10. The method recited in claim 9, the method further comprising:
identifying a pre-determined 3D mesh corresponding with the object type.

11. The method recited in claim 1, wherein the respective second locations are determined at least in part based on positioning one or more of the fiducial points within a pre-determined 3D mesh.

12. The method recited in claim 1, wherein the plurality of 2D images form a multi-view capture constructed based on inertial measurement unit (IMU) data and navigable in three dimensions.

13. A system configured to perform a method, the method comprising:
identifying via a processor a plurality of fiducial points by applying a neural network to a plurality of two-dimensional (2D) images of a vehicle, the 2D images being captured from respective camera viewpoints by a handheld visible light camera as the handheld visible light camera moves along a path through space, each fiducial point corresponding with a respective first one or more locations in the 2D images;
determining via the processor a respective second location in a three-dimensional (3D) coordinate space for each fiducial point based on the first one or more locations;
determining via the processor a 3D skeleton of the vehicle based at least in part on the second locations in the 3D coordinate space;
determining via the processor a pose of the vehicle for a designated camera viewpoint based on the 3D skeleton;
using the pose, automatically generating a panel of a component of the vehicle, the panel comprising a plurality of views of the component of the vehicle; and
causing the panel to be stored on a storage device.

14. The system recited in claim 13, the method further comprising:
determining a respective bounding box around the object for one or more of the plurality of 2D images.

15. The system recited in claim 13, wherein the pose includes a roll value, a pitch value, and a yaw value for the object relative to the designated camera viewpoint, and wherein the pose includes three translation values identifying a location of the object in the 3D coordinate space relative to the designated camera viewpoint.

16. The system recited in claim 13, wherein the object is a vehicle, and wherein the 3D skeleton includes a door and a windshield, and wherein the fiducial points include a headlight portion, a rear-view mirror portion, and a wheel portion.

17. The system recited in claim 13, wherein the neural network is pretrained to segment objects into components and to classify object components.

18. One or more non-transitory computer readable media having instructions stored thereon for performing a method, the method comprising:

identifying via a processor a plurality of fiducial points by applying a neural network to a plurality of two-dimensional (2D) images of a vehicle, the 2D images being captured from respective camera viewpoints by a handheld visible light camera as the handheld visible light camera moves along a path through space, each fiducial point corresponding with a respective first one or more locations in the 2D images;

determining via the processor a respective second location in a three-dimensional (3D) coordinate space for each fiducial point based on the first one or more locations;

determining via the processor a 3D skeleton of the vehicle based at least in part on the second locations in the 3D coordinate space;

determining via the processor a pose of the vehicle for a designated camera viewpoint based on the 3D skeleton;

using the pose, automatically generating a panel of a component of the vehicle, the panel comprising a plurality of views of the component of the vehicle; and causing the panel to be stored on a storage device.

19. The method recited in claim 1, wherein the panel comprises a plurality of standardized views of the component captured from different viewpoints.

20. The method recited in claim 19, wherein automatically generating a panel of a component of the vehicle comprises: combining the different standardized views to create a multi-view presentation of the component.

* * * * *